US008280563B2

(12) United States Patent
McGuffin et al.

(10) Patent No.: US 8,280,563 B2
(45) Date of Patent: Oct. 2, 2012

(54) METHOD AND SYSTEM TO REDUCE IMPACT OF NON-ATC DATA-LINK MESSAGES ON ATC DATA-LINK MESSAGES ON A SHARED AIR-GROUND COMMUNICATION LINK

(75) Inventors: Thomas F. McGuffin, Bellevue, WA (US); Willard R. True, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 181 days.

(21) Appl. No.: 12/618,258

(22) Filed: Nov. 13, 2009

(65) Prior Publication Data

US 2011/0118904 A1 May 19, 2011

(51) Int. Cl.

| | |
|---|---|
| ***G01C 23/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |
| *H04L 12/28* | (2006.01) |
| *H04L 12/56* | (2006.01) |

(52) U.S. Cl. .......................................... 701/3; 370/401

(58) Field of Classification Search .................. 701/1, 3, 701/8, 120, 301; 342/32, 36, 37; 370/401; 709/203, 230, 238

See application file for complete search history.

(56) References Cited

U.S. PATENT DOCUMENTS

| | | | | |
|---|---|---|---|---|
| 5,668,880 | A * | 9/1997 | Alajajian | 370/342 |
| 5,798,726 | A * | 8/1998 | Schuchman et al. | 342/37 |
| 6,178,391 | B1 * | 1/2001 | Anderson et al. | 703/1 |
| 6,262,679 | B1 * | 7/2001 | Tran | 342/29 |
| 6,275,767 | B1 * | 8/2001 | Delseny et al. | 701/120 |
| 6,353,779 | B1 | 3/2002 | Simon et al. | |
| 6,760,778 | B1 | 7/2004 | Nelson et al. | |
| 6,931,248 | B2 | 8/2005 | Borel | |
| 7,003,293 | B2 | 2/2006 | D'Annunzio | |
| 7,177,939 | B2 * | 2/2007 | Nelson et al. | 709/230 |
| 7,194,523 | B2 | 3/2007 | Nelson et al. | |
| 7,495,602 | B2 | 2/2009 | Sandell et al. | |
| 7,519,014 | B2 * | 4/2009 | Allen et al. | 370/310 |

(Continued)

FOREIGN PATENT DOCUMENTS

EP 1798872 6/2007

(Continued)

OTHER PUBLICATIONS

European Patent Office, "European Search Report", Nov. 24, 2010, Published in: EP.

*Primary Examiner* — Khoi Tran
*Assistant Examiner* — Nicholas Kiswanto
(74) *Attorney, Agent, or Firm* — Fogg & Powers LLC

(57) ABSTRACT

A system to send air traffic control (ATC) data-link messages from an aircraft is provided. The system includes ATC applications in a first portion of an application layer, non-ATC applications in a second portion of the application layer; and a communication manager in the aircraft having two addresses for the aircraft. The communication manager includes a first copy of software in a first data link layer and a second copy of the software in a second data link layer. ATC data-link messages are sent from the aircraft independent of non-ATC data-link messages sent from the aircraft.

20 Claims, 3 Drawing Sheets

U.S. PATENT DOCUMENTS

| | | | | |
|---|---|---|---|---|
| 7,532,640 | B2 * | 5/2009 | Kelly et al. | 370/466 |
| 7,808,891 | B2 * | 10/2010 | Law | 370/217 |
| 2003/0158963 | A1 * | 8/2003 | Sturdy et al. | 709/238 |
| 2005/0286452 | A1 | 12/2005 | Hardgrave et al. | |
| 2008/0043687 | A1 * | 2/2008 | Lee | 370/338 |
| 2009/0041041 | A1 | 2/2009 | True et al. | |
| 2009/0077626 | A1 | 3/2009 | Leclercq et al. | |
| 2010/0042272 | A1 * | 2/2010 | Gruyer et al. | 701/8 |

FOREIGN PATENT DOCUMENTS

| | | |
|---|---|---|
| EP | 2063550 | 5/2009 |
| WO | 2007064734 | 6/2007 |

* cited by examiner

METHOD AND SYSTEM TO REDUCE IMPACT OF NON-ATC DATA-LINK MESSAGES ON ATC DATA-LINK MESSAGES ON A SHARED AIR-GROUND COMMUNICATION LINK

BACKGROUND

Current aircraft air-ground data-link systems transport both air traffic control (ATC) data-link messages and non-ATC data-link messages on the same very high frequency (VHF) frequency. Both message types compete for the limited bandwidth available. Air traffic control (ATC) is a service provided by ground-based controllers, who direct aircraft on the ground and in the air. The primary purpose of ATC systems is to separate aircraft in order to prevent collisions, to organize and expedite the flow of traffic, and to provide information and other support for pilots. The non-ATC data-link messages are the messages other than traffic control messages.

Once a data-link message reaches the data link layer in the communication management unit, the transmission of the data-link message from the aircraft is strictly a first-in-first-out (FIFO) process. In currently available aircraft communication systems, the ATC data-link messages are sometimes delayed by non-ATC data-link messages being sent from the same aircraft despite the efforts to expedite the ATC messages. For example, a time-critical ATC data-link message can be delayed by a large non-ATC data-link message that was received at the data link layer prior to the ATC data-link message. If the delay is too long, the pilot and controller revert to using voice communication, which reduces the system efficiency and increases the workload for the pilot and controller.

Prior art solutions to overcome this delay of ATC data-link messages require adding another VHF radio and antenna to the aircraft and ground system, which is expensive.

SUMMARY

The present application relates to a system to send air traffic control (ATC) data-link messages from an aircraft. The system includes ATC applications in a first portion of an application layer, non-ATC applications in a second portion of the application layer, and a communication manager in the aircraft having two addresses for the aircraft. The communication manager includes a first copy of software in a first data link layer and a second copy of the software in a second data link layer. ATC data-link messages are sent from the aircraft independent of non-ATC data-link messages sent from the aircraft.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

The air-ground data communications establishes a link between the aircraft and the ground system on a VHF frequency. Messages are exchanged between the aircraft and the ground system to maintain the link and monitor its availability. As described herein, two data link addresses are assigned to an aircraft so that the aircraft appears as two entities in the data link system. One data link address is for ATC messages being transmitted and received on a first logical channel. The other data link address is for non-ATC messages being transmitted and received on a second logical channel. In embodiments, both connections coexist on the same VHF frequency. The protocols being implemented on the first and second logical channels indicate to the ground station (or airline dispatch) which connection is for ATC messages and which connection is for non-ATC messages. In one implementation of this embodiment, an ATN communication protocol is used for the ATC logical channel. In another implementation of this embodiment, the other logical channel supports a non-ATC aircraft communications addressing and reporting system (ACARS) communication protocol.

The software in an avionics computer (referred to as a communication management unit (CMU) or communication manager) is modified to support two independent instances of the air-ground communication links using one radio and using separate aircraft addresses. In one implementation of this embodiment, the radio is modified to support two virtual interfaces to the communication management unit in order to further reduce interaction between the two communication links (i.e., duplicate buffers and protocol states for messages).

Figure 1:
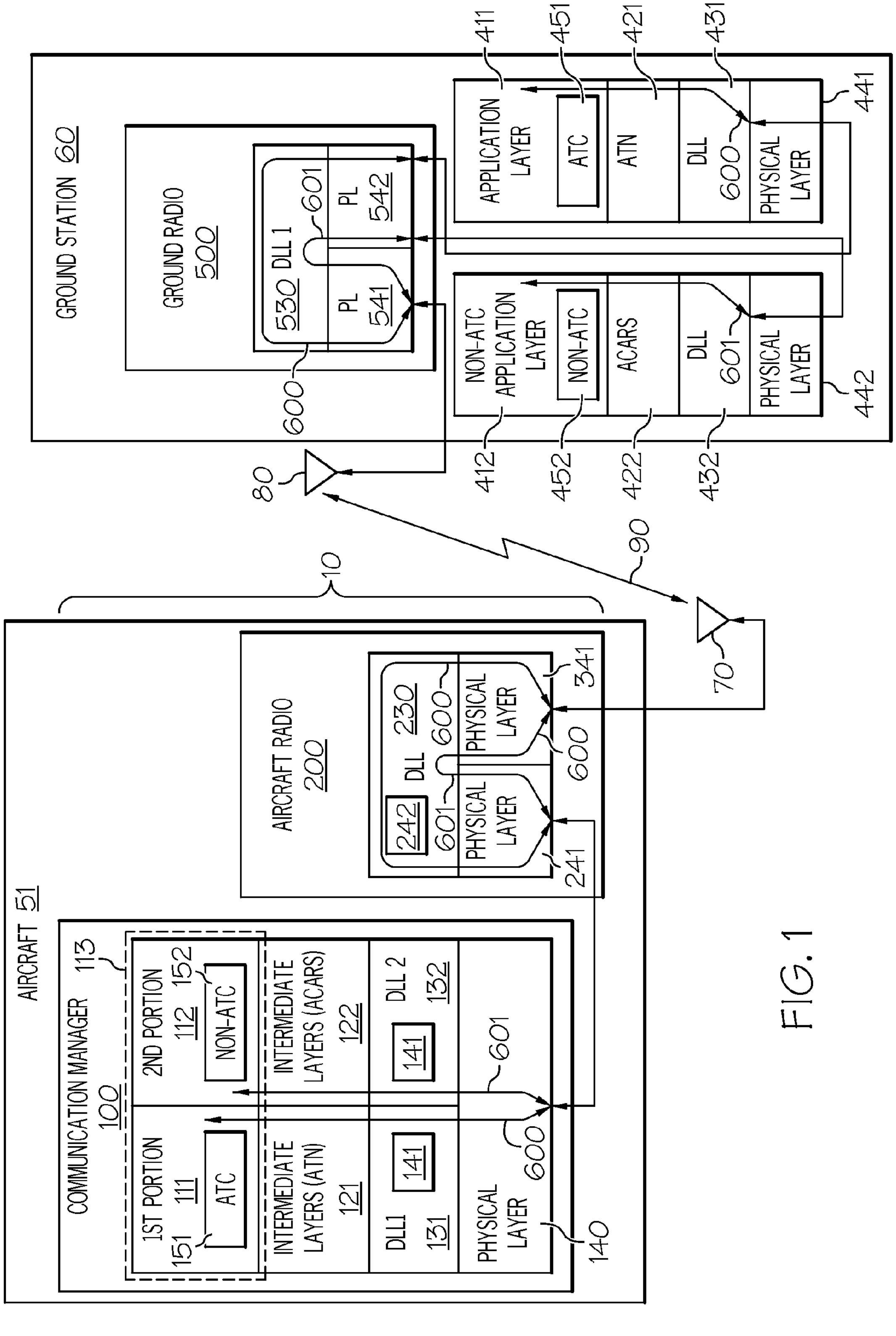
FIG. 1 is an embodiment of a system to send air traffic control (ATC) and non-ATC data-link messages from an aircraft in accordance with the present invention.

FIG. 1 is an embodiment of a system 10 to send air traffic control (ATC) and non-ATC data-link messages from an aircraft 51 in accordance with the present invention. The system 10 includes a communication manager 100 and a radio 200 located in the aircraft 51. The aircraft 51 has two addresses for the communication manager 100.

The communication manager 100 includes a first copy of software 141 in a first data link layer 131, a second copy of the software 141 in a second data link layer 132, ATC applications 151 in a first portion 111 of an application layer 113, and non-ATC applications 152 in a second portion 112 of the application layer 113. The communication manager 100 also includes a physical layer 140. The communication manager 100 also includes a first set of intermediate layers 121 and a second set of intermediate layers 122. The first set of intermediate layers 121 is between the first data link layer 131 and the first portion 111 of the application layer 113. The second set of intermediate layers 122 is between the second data link layer 132 and the second portion 112 of the application layer 113. The ATC applications 151 are communicatively coupled to the first data link layer 131 via the first set of intermediate layer 121 on a first logical channel that is associated with a first address of the aircraft 51. The transmission path of data in the first logical channel is indicated as line 600 extending through the appropriate layers (e.g., first portion 111 of the application layer 113, first set of intermediate layers 121, first data link layer 131, and physical layer 140). Likewise, the non-ATC applications 152 are communicatively coupled to the second data link layer 132 via the second set of intermediate layers 122 on a second logical channel that is associated with a second address of the aircraft 51. The transmission path of data in the second logical channel is indicated as line 601 extending through the appropriate layers (e.g., second portion 112 of the application layer 113, second set of intermediate layers 122, second data link layer 132, and physical layer 140).

The aircraft radio 200 includes a data link layer 230 including software 242, and physical layers 241 and 341. The physical layer 140 in the communication manager 100 is communicatively coupled to the physical layer 241 in the aircraft radio 200. The first logical channel and the second logical channel use the same physical link between the physical layer 140 and the physical layer 241, and use the same physical link in the physical layer 241, the data link layer 230, and the physical layer 341. The physical layer 341 is communicatively coupled to an aircraft antenna 70. The first logical channel and the second logical channel use the same physical link between the physical layer 341 and the aircraft antenna 70.

The aircraft antenna 70 is communicatively coupled via communication link 90 to ground antenna 80 at a ground station 60. Both the first logical channel and the second logical channel are sent over the communication link 90. The communication link 90 is a wireless communication link as is known in the art.

The ground station includes a ground radio 500, an ATC-based layer architecture and a non-ATC-based layer architecture. The ground radio 500 includes a data link layer 530, and physical layers 541 and 542. The physical layer 541 is communicatively coupled to the ground antenna 80. Both the first logical channel and the second logical channel use the same physical link between the physical layer 541 and the ground antenna 80.

The first logical channel uses the physical link between the physical layer 542 in the ground radio 500 and the physical layer 441 in the ATC-based layer architecture. The second logical channel uses the physical link between the physical layer 542 in the ground radio 500 and the physical layer 442 in the non-ATC-based layer architecture. In this manner, the ground station 500 supports ATN and AOC traffic at the same time to the same aircraft.

The ATC-based layer architecture includes the physical layer 441, a data link layer 431, intermediate aeronautical telecommunications network layer 421, and an application layer 411 with ATC applications 451. The non-ATC-based layer architecture includes the physical layer 442, a data link layer 432, intermediate ACARS network layer 422, and an application layer 412 with non-ATC applications 452.

The ATC data-link messages are sent to a ground station 60 by implementing the first logical channel reserved for air traffic control data-link messages using the first address of the aircraft 51. The data on the first logical channel is transmitted via the path indicated as line 600. The first logical channel implements an aeronautical telecommunications network (ATN) communication protocol.

The non-ATC data-link messages are sent to the ground station 60 by implementing the second logical channel reserved for AOC data-link messages using the second address of the aircraft 51. The second logical channel implements an aircraft communications addressing and reporting system (ACARS) over aviation very high frequency link control (AVLC) protocol. The data on the second logical channel is transmitted along the path indicated as line 601. The first logical channel and second logical channel are on the same frequency. In this manner, the ATC data-link messages are sent from the aircraft 51 independent of non-ATC data-link messages sent from the aircraft 51.

As defined herein, a first message (i.e., an ATC data-link message) that is sent independent of a second message (i.e., a non-ATC data-link message) is a first message that is transmitted on a different link (virtual or physical) from the second message so that the first message and the second message do not queue in the data link layer of the communication manager (communication management unit) in a first-in-first-out manner with each other. The different link (virtual or physical) include some portions of overlap, but the data link layers, the intermediate layers and the application layers of the communication manager (communication management unit) do not overlap. Since the non-ATC data-link messages have a different address from the ATC messages and are not sent on the same data link as the ATC data-link messages, the impact of non-ATC data-link messages on the ATC data-link messages on a shared air-ground communication link is reduced.

In one implementation of this embodiment, the non-ATC data-link messages are aeronautical operational control (AOC) data-link messages. AOC includes the applications used for communication of an aircraft with its airline or service partners on the ground. In another implementation of this embodiment, the communication manager 100 is a communication management unit 100.

Figure 2:
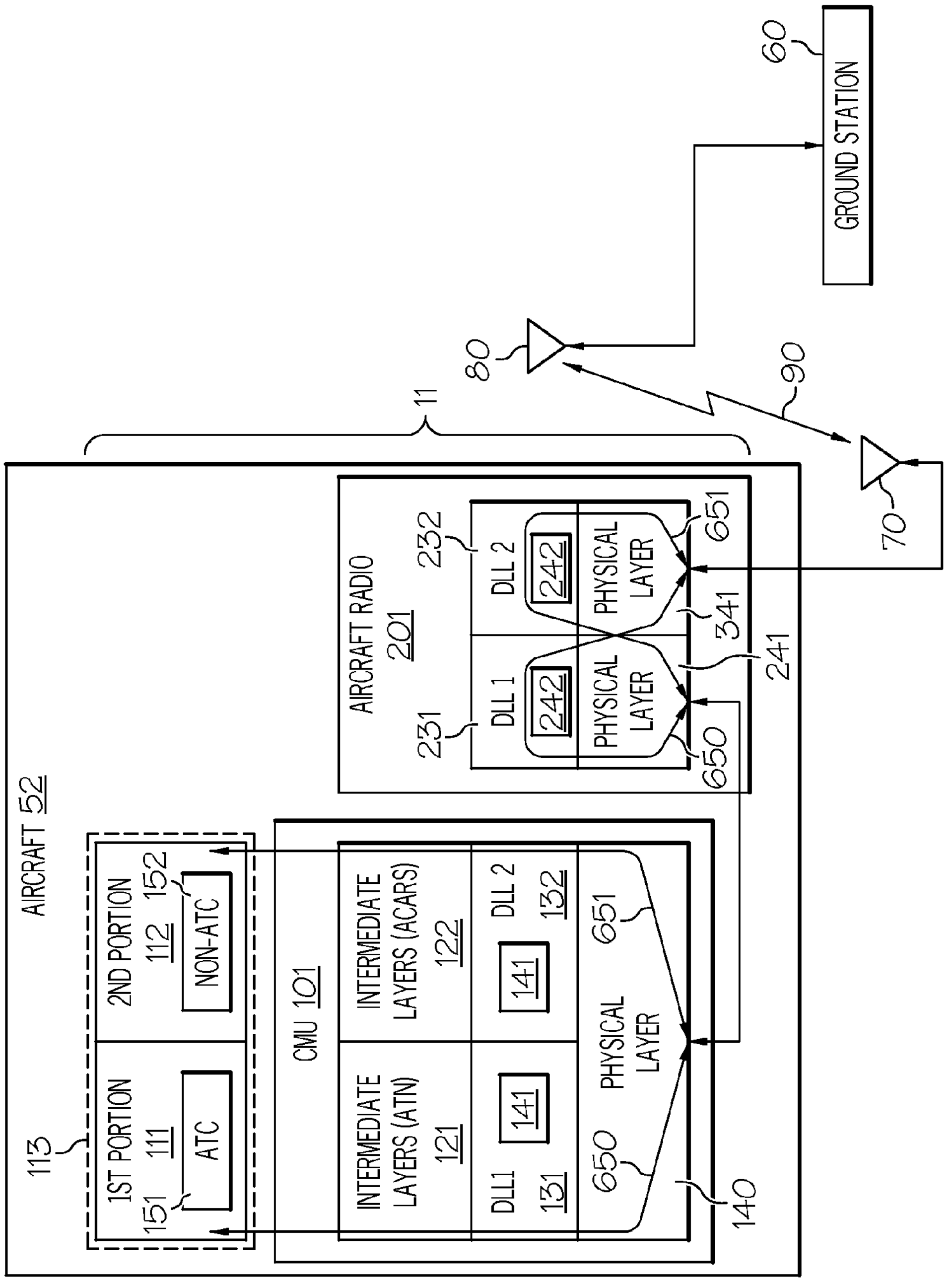
FIG. 2 is an embodiment of a system to send ATC and non-ATC data-link messages from an aircraft in accordance with the present invention.

FIG. 2 is an embodiment of a system 11 to send ATC and non-ATC data-link messages from an aircraft 52 in accordance with the present invention. The system 11 includes a communication management unit 101, an application layer 113, and an aircraft radio 201. The application layer 113 in system 11 is on the aircraft 52, but is external to the communication management unit 101. ATC applications 151 are in a first portion 111 of the application layer 113 and non-ATC applications 152 are in a second portion 112 of the application layer 113.

The data link layers in the radio 201 of system 11 differ from the data link layer 230 of the radio 200 in system 10 (FIG. 1). There are two radio data link layers 231 and 231 in the aircraft radio 201 in system 11 rather than the one radio data link layer 230 of system 10. The radio 201 on the aircraft 52 has duplicated copies of software 242 in a first radio data link layer 231 and a second radio data link layer 232. Specifically, the two data link layers 231 and 232 are formed by the duplication of the software 242 in the data link layer of the aircraft radio 201. The ATC applications 151 are communicatively coupled to the first radio data link layer 231 and the non-ATC applications 152 are communicatively coupled to the second radio data link layer 232.

The ATC data-link messages are sent to a ground station 60 via a first logical channel reserved for air traffic control data-link messages using the first address of the aircraft 52. The first logical channel implements the aeronautical telecommunications network (ATN) communication protocol. The transmission path of data in the first logical channel is indicated as line 650 extending through the appropriate layers (e.g., first portion 111 of the application layer 113, first set of intermediate layers 121, first data link layer 131, physical layer 140, physical layer 421, data link layer 231, and physical layer 341).

The non-ATC data-link messages are sent to the ground station 60 via a second logical channel reserved for AOC data-link messages using the second address of the aircraft 52. The transmission path of data in the second logical channel is indicated as line 651 extending through the appropriate layers (e.g., first portion 111 of the application layer 113, first set of intermediate layers 121, first data link layer 131, and physical layer 140, physical layer 421, data link layer 232, and physical layer 341). As shown in FIG. 2, the first logical channel is communicatively coupled in the aircraft radio 210 via the physical layer 241, data link layer 231, and physical layer 341 to the antenna 70. The second logical channel 651 is communicatively coupled in the aircraft radio 210 via the physical layer 241, data link layer 232, and physical layer 341 to the antenna 70.

The second logical channel implements an ACARS protocol. The first logical channel and second logical channel are on the same frequency. In one implementation of this embodiment, the second logical channel implements the ACARS over aviation very high frequency link control (AVLC) protocol. In this manner, the ATC data-link messages are sent from the aircraft 52 independent of non-ATC data-link messages sent from the aircraft 52.

Figure 3:
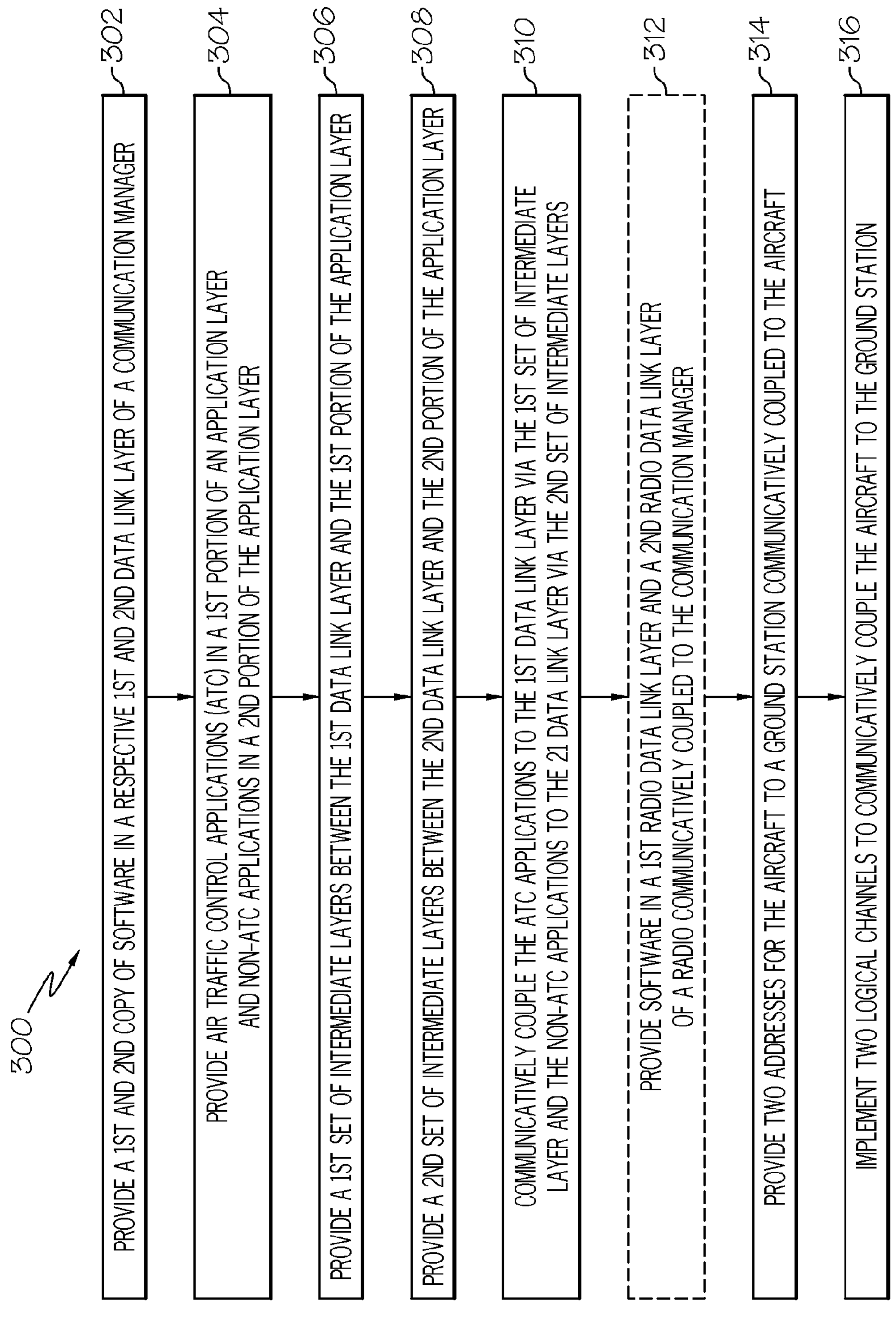
FIG. 3 is an embodiment of a method to send ATC data-link messages from an aircraft independent of non-ATC data-link messages sent from the same aircraft in accordance with the present invention.

FIG. 3 is an embodiment of a method to send ATC data-link messages from an aircraft independent of non-ATC data-link messages sent from the same aircraft in accordance with the present invention. Method 300 is described herein with reference to system 10 (FIG. 1). Method 300 can be implemented by the system 11 (FIG. 2) as is understandable by one skilled in the art upon reading this document.

At block 302, a first copy of software 141 is provided in the first data link layer 131 of the communication manager 100 and the second copy of software 141 is provided in the second data link layer 132 of the communication manager 100. Two data link layers 131 and 132 are formed by providing two copies of software 141 in the data link layer of the communication manager 100.

At block 304, air traffic control (ATC) applications 151 are provided in a first portion 111 of an application layer 113 of the communication manager 100 and non-ATC applications 152 are provided in a second portion 112 of the application layer 113 of the communication manager 100. In one implementation of this embodiment, the air traffic control (ATC) applications 151 and non-ATC applications 152 are external to the communication manager 100. In another implementation of this embodiment, the air traffic control (ATC) applications 151 and non-ATC applications 152 are in a communication management unit.

At block 306, a first set of intermediate layers 121 are provided between the first data link layer 131 and the first portion 111 of the application layer 113. The first set of intermediate layers 121 support ATN protocols. At block 308, a second set of intermediate layers 122 are provided between the second data link layer 132 and the second portion 112 of the application layer 113. The second set of intermediate layers 122 support ACARS protocols.

At block 310, the ATC applications 151 are communicatively coupled to the first data link layer 131 via the first set of intermediate layer 121 in a first logical channel, which has a first address in the aircraft. Likewise, the non-ATC applications 152 are communicatively coupled to the second data link layer 132 via the second set of intermediate layers 122 in a second logical channel, which has a second address in the aircraft.

In one implementation of this embodiment, software 242 is provided in a radio data link layer 230 of a radio 200 communicatively coupled to the communication manager 100 (FIG. 1). In an optional implementation of this embodiment, at block 312, software 242 is provided in a first radio data link layer 231 of a radio 201 and the software 242 is also provided in a second radio data link layer 232 of the radio 201 (FIG. 2). In this case, two radio data link layers 231 and 232 are formed by providing two copies of software 242 in a data link layer of the radio 201 in the aircraft 52. The aircraft radio 201 is communicatively coupled to the communication manager 100.

At block 314, two addresses are provided for the aircraft 50 to a ground station 60 communicatively coupled to the aircraft 50. The first address of the aircraft 51 is for the first logical channel and the second address of the aircraft 51 for the second logical channel.

At block 316, two logical channels are implemented to communicatively couple the aircraft 51 to the ground station 60. The ATN communication protocol is implemented on the first logical channel. The ACARS protocol is implemented on the second logical channel. In one implementation of this embodiment, the ACARS over AVLC (AOA) protocol is implemented on the second logical channel. The first logical channel is reserved for air traffic control data-link messages to communicatively couple the aircraft 51 or 52, respectively, to the ground station 60. The second logical channel is reserved for non-ATC data-link messages to communicatively couple aircraft 51 or 52, respectively to the ground station 60. In this manner, ATC data-link messages are sent from the aircraft 51 independent of non-ATC data-link messages sent from the aircraft 51. The first and second logical channels share the air-ground communication link 90 that communicatively couples the aircraft antenna 70 to the ground station antenna 80 without the time-critical ATC messages being delayed by the non-ATC messages.

It will be understood that various modifications to the described embodiments may be made without departing from the spirit and scope of the claimed invention. Accordingly, other embodiments are within the scope of the following claims.

What is claimed is:

1. A system to send air traffic control (ATC) data-link messages from an aircraft, the system comprising:

a communication manager in the aircraft having two data link addresses for the aircraft, the communication manager comprising:

a first copy of software in a first data link layer portion assigned a first one of the two data link addresses and configured to communicate ATC data-link messages; and a second copy of the software in a second data link layer portion assigned a second one of the two data link addresses and configured to communicate non-ATC data-link messages, wherein the aircraft is configured to execute ATC applications in a first portion of an application layer onboard the aircraft, and wherein the aircraft is configured to execute non-ATC applications in a second portion of the application layer onboard the aircraft, and wherein the ATC data-link messages are sent from the aircraft independent of the non-ATC data-link messages sent from the aircraft via a physical link between the communication manager and an aircraft radio.

2. The system of claim 1, further comprising:

a first set of intermediate layers between the first data link layer portion and the first portion of the application layer, wherein the ATC applications are communicatively coupled to the first data link layer portion via the first set of intermediate layer; and a second set of intermediate layers between the second data link layer portion and the second portion of the application layer, wherein the non-ATC applications are communicatively coupled to the second data link layer portion via the second set of intermediate layers.

3. The system of claim 2, further comprising:

the aircraft radio on the aircraft having duplicated copies of radio-based software in a first radio data link layer portion and a second radio data link layer portion, wherein ATC applications are communicatively coupled to the first radio data link layer portion and the non-ATC applications are communicatively coupled to the second radio data link layer portion.

4. The system of claim 2, wherein ATC data-link messages are sent to a ground station via a first logical channel reserved for the air traffic control data-link messages using the first data link address of the aircraft, and wherein non-ATC data-link messages are sent to the ground station via a second logical channel reserved for aeronautical operational control (AOC) data-link messages using the second data link address of the aircraft.

5. The system of claim 4, wherein the first logical channel implements an aeronautical telecommunications network (ATN) communication protocol, and wherein the second logical channel implements an aircraft communications addressing and reporting system (ACARS) over aviation very high frequency link control (AVLC) protocol.

6. The system of claim 4, wherein the first logical channel and second logical channel are on the same frequency.

7. The system of claim 1, wherein the ATC applications in the first portion of the application layer and the non-ATC applications in the second portion of the application layer are in the communication manager.

8. The system of claim 1, wherein the non-ATC data-link messages are aeronautical operational control (AOC) data-link messages.

9. The system of claim 1, wherein the communication manager is a communication management unit.

10. A method to send air traffic control (ATC) data-link messages from an aircraft independent of aeronautical operational control (AOC) data-link messages sent from the same aircraft, the method comprising:

providing a first data link address and a second data link address for the aircraft to a ground station communicatively coupled to the aircraft;

sending the ATC data-link messages from the aircraft to the ground station via a physical link between a communication manager in the aircraft and an aircraft radio using a first logical channel that is associated with the first data link address and reserved for the ATC data-link messages; and independently sending the aeronautical operational control (AOC) data-link messages from the aircraft to the ground station using a second logical channel that is associated with the second data link address and reserved for the aeronautical operational control (AOC) data-link messages.

11. The method of claim 10, further comprising:

providing a first copy of software in a first data link layer portion of a communication manager; and providing a second copy of software in a second data link layer portion of the communication manager.

12. The method of claim 11, further comprising:

providing air traffic control (ATC) applications in a first portion of an application layer of the communication manager; and providing non-ATC applications in a second portion of the application layer of the communication manager.

13. The method of claim 12, further comprising:

providing a first set of intermediate layers between the first data link layer portion and the first portion of the application layer;

communicatively coupling the ATC applications to the first data link layer portion via the first set of intermediate layer;

providing a second set of intermediate layers between the second data link layer portion and the second portion of the application layer; and communicatively coupling the non-ATC applications to the second data link layer portion via the second set of intermediate layers.

14. The method of claim 13, further comprising:

providing software in a first radio data link layer portion of an aircraft radio communicatively coupled to the communication manager; and providing the software in a second radio data link layer portion of the aircraft radio.

15. The method of claim 10, further comprising:

implementing an aeronautical telecommunications network (ATN) communication protocol on the first logical channel; and implementing an aircraft communications addressing and reporting system (ACARS) over aviation very high frequency link control (AVLC) protocol on the second logical channel.

16. A method to send air traffic control (ATC) data-link messages from an aircraft independent of aeronautical operational control (AOC) data-link messages sent from the same aircraft, the method comprising:

sending the ATC data-link messages from the aircraft via a physical link between a communication manager in the aircraft and an aircraft radio by implementing a first logical channel, which is associated with a first data link address and reserved for air traffic control data-link messages, to communicatively couple the aircraft to the ground station; and independently sending the aeronautical operational control (AOC) data-link messages from the aircraft via the physical link between the communication manager in the aircraft and the aircraft radio by implementing a second logical channel, which is associated with a second data link address and reserved for non-ATC data-link messages, to communicatively couple the aircraft to the ground station.

17. The method of claim 16, further comprising providing the first data link address for the aircraft and the second data link address for the aircraft to the ground station communicatively coupled to the aircraft.

18. The method of claim 16, further comprising:

providing copies of software in a data link layer portion of a communication manager in the aircraft to form two data link layer portions.

19. The method of claim 18, further comprising:

providing copies of software in a data link layer portion of the aircraft radio in the aircraft to form two radio data link layer portions.

20. The method of claim 18, further comprising:

providing air traffic control applications in a first portion of an application layer of the communication manager; and providing non-ATC applications in a second portion of the application layer of the communication manager, wherein ATC data-link messages are sent from the aircraft independent of AOC data-link messages sent from the aircraft.

* * * * *